March 6, 1962 — E. PURSE — 3,023,916
MEANS FOR ALIGNING STACKED PALLETS
Filed Dec. 28, 1959 — 2 Sheets-Sheet 1
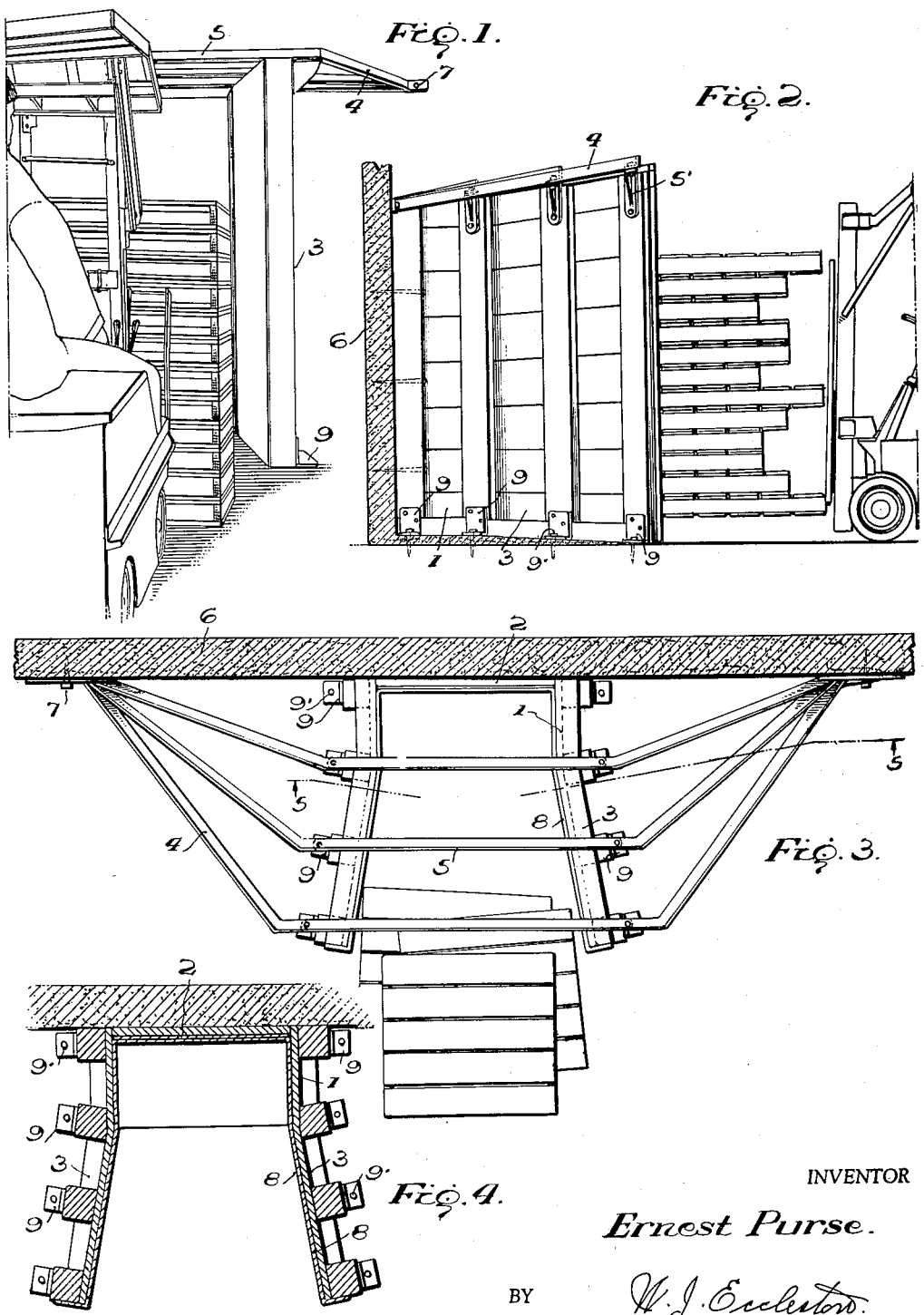
INVENTOR
Ernest Purse.
BY W. J. Eccleston
ATTORNEY

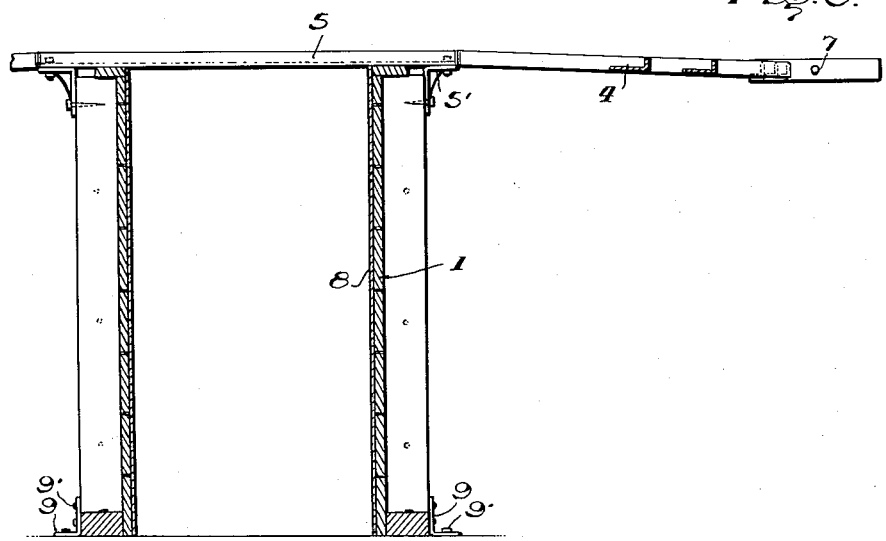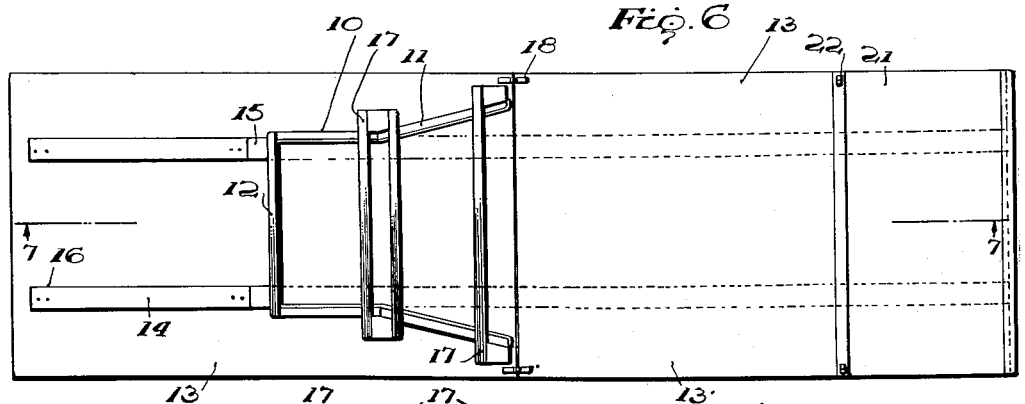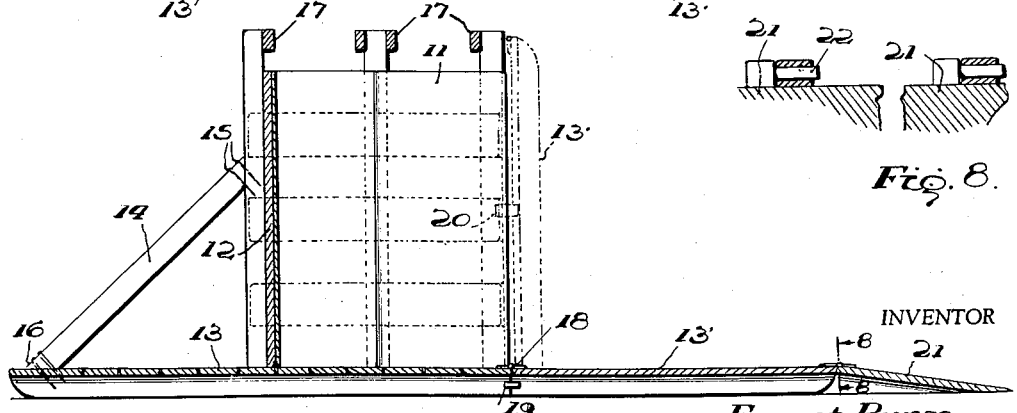

United States Patent Office 3,023,916
Patented Mar. 6, 1962

3,023,916
MEANS FOR ALIGNING STACKED PALLETS
Ernest Purse, 8801 Seneca St., Oakland, Calif.
Filed Dec. 28, 1959, Ser. No. 466
4 Claims. (Cl. 214—10.5)
(Granted under Title 35, U.S. Code (1952), sec. 266)

The invention described herein, if patented, may be manufactured and used by or for the Government for governmental purposes, without the payment to me of any royalty thereon.

This invention relates to a method and means for vertically aligning a stack of pallets mounted on the forks of a forklift truck.

The conventional pallets are frequently stored in warehouses when not in use and forklift trucks are more or less generally used for stacking the pallets to a height compatible with the vertical range of the carriage of the truck. In order to so stack a plurality of pallets, it becomes necessary that the several minor stacks which are transported by the truck and stacked upon each other in order to form the major stacks stored in the warehouse be vertically aligned for the purpose of stability.

To this end it is an object of the present invention to provide a simplified, inexpensive method for vertically aligning the pallets on the truck prior to their deposit in the warehouse.

Another object of the invention consists in providing a simplified and stationary means adapted to cooperate with a moving forklift truck so as to automatically align vertically a stack of pallets carried by the truck as the truck brings the stack into contact with such means.

A further object of the invention resides in the provision of a portable mechanism for accomplishing such alignment of the pallets as they are carried forward by the forklift truck.

A still further object of the invention consists in providing such a portable mechanism with a pivoted forward platform and a removable ramp for directing a forklift truck into cooperative relation with the alignment mechanism.

Other objects and advantages of the invention will be apparent from the following description taken in connection with the accompanying drawings, in which, FIG. 1 is a fragmentary view of a stationary pallet mounted in a warehouse or the like and showing a stack of previously straightened pallets being withdrawn from the vertically aligning device;

FIG. 2 is a side elevational view partly in section of the fixed aligning device showing a stack of irregularly placed pallets being carried into the device;

FIG. 3 is a plan view of the aligning mechanism showing a haphazard arrangement of pallets to be aligned;

FIG. 4 is a horizontal sectional view taken through the mechanism of FIG. 3;

FIG. 5 is a vertical sectional view taken on the line 5—5 of FIG. 3;

FIG. 6 is a plan view of a portable aligning device;

FIG. 7 is a longitudinal sectional view taken on the line 7—7 of FIG. 6; and

FIG. 8 is a fragmentary sectional detail showing the slip hinge mechanism of the pivoted ramp.

Referring to the drawings in greater detail and by reference numerals, especially to FIGS. 1 to 5 inclusive, the side walls of the vertically aligning device are indicated by the numeral 1, the back wall by the numeral 2, and the outwardly flared extensions of the side walls by the numeral 3. The side walls are preferably formed of wood and braced by suitable metal rods 4 which are integral with the horizontal beams 5 which are secured to the side walls and extensions by brackets 5' as indicated in FIG. 5. These brace rods 4—5 have their remote ends secured to the wall 6 of the warehouse or the like by any suitable fastening means 7 as shown in FIGS. 1 and 3. The side walls and extensions 1 and 3, respectively, and the back wall 2 are preferably lined with heavy gauge metal as indicated by the numeral 8 so as to protect these walls from heavy wear and tear caused by impingement of the pallets thereagainst in the aligning operation. These walls are further braced at their lower ends by means of brackets 9 secured to the floor of the warehouse and to the side walls of the straightening mechanism by suitable fastening means 9'.

The portable structure for aligning a stack of pallets operates in substantially the same manner as that shown in FIGS. 1 to 5, inclusive. However, in this portable construction, the side walls 10 and their flared extensions 11, together with the back wall 12 are mounted on a platform 13, the back wall being reinforced by suitable braces 14 having their inner ends secured to the back wall 12 as indicated by the numeral 15, and their outer ends suitably secured to the rear end of the platform 13 as indicated by the numeral 16. The side walls and extensions in this modified construction may be tied together by suitable beams 17.

Pivotally connected to the front end of platform 13, as indicated by the numeral 18, is a supplemental platform 13'. This supplemental platform may be releasably secured in its operative horizontal position by means of any suitable type of locking means 19. As indicated by the dotted lines in FIG. 7, this supplemental platform 13' may be swung into vertical inoperative position and may be secured in such position by releasable locking means 20. Removably secured to the forward end of supplemental platform 13' is a short ramp 21. This ramp is pivotally connected to the forward end of the supplemental platform 13' by means of slip hinges 22, and, as clearly indicated in FIG. 7, this ramp 21 may be removed from the supplemental platform 13' prior to its swinging into its inoperative position as shown in FIG. 7.

The operation of the device will be readily understood. A forklift truck carrying a stack of pallets haphazardly arranged with respect to each other, as shown in FIGURES 2 and 3, is forced into the space between the side walls and their extensions and into contact with the rear wall 2 or 12. As the irregular stack enters between the extensions 3 or 11 certain of the pallets will engage the extensions and be gradually forced into alignment with each other laterally, and as the truck reaches the end of its possible forward movement, the pallets will be aligned in a fore-and-aft direction by contact with the rear walls; the final arrangement of the pallets will be as shown in FIGURE 1.

In accordance with the patent statutes, I have described what I now consider to be the preferred form of the method and means for aligning stacked pallets, but inasmuch as various minor changes may be made in structural details without departing from the spirit of the invention, it is intended that all such changes be included within the scope of the appended claims.

I claim:

1. A device for use in vertically aligning a plurality of pallets stacked upon the forks of a forklift truck, said device comprising two side walls, a rear wall and open front, said side walls being spaced apart at their forward edges a distance somewhat greater than the width of a pallet and tapering rearwardly so that their rear edges are spaced apart a distance corresponding to the width of a pallet; whereby an irregular stack of pallets being moved through said open front in a direction towards said rear wall is straightened by impingement against said rear wall and tapering side walls.

2. A device for use in vertically aligning a plurality of pallets stacked upon the forks of a forklift truck, said device comprising an enclosure having a pair of side walls spaced apart a distance corresponding to the width of a pallet, each side wall including an outwardly flared forward extension, and a rear wall connecting the rear edges of the side walls; whereby an irregular stack of pallets being moved in a direction towards said rear wall is straightened by impingement against said rear wall and flared extensions of said side walls.

3. A device for use in vertically aligning a plurality of pallets stacked upon the forks of a forklift truck, said device comprising an enclosure having a pair of side walls spaced apart a distance corresponding to the width of a pallet, each side wall including an outwardly flared forward extension, a rear wall connecting the rear edges of the side walls, and a covering of heavy gauge metal for the inner faces of all of said walls; whereby an irregular stack of pallets being moved in a direction towards said rear wall is straightened by impingement against said rear wall and flared extensions of said side walls.

4. A portable device for use in vertically aligning a plurality of pallets stacked upon the forks of a forklift truck, said device comprising an elongated platform somewhat wider than conventional pallets, a supplemental platform hinged to the forward end of the elongated platform, a removable ramp hinged to the forward end of the supplemental platform by means of slip hinges, an enclosure mounted on the elongated platform and comprising a pair of side walls spaced apart a distance corresponding to the width of a pallet, each side wall including an outwardly flared forward extension, and a rear wall connecting the rear edges of the side walls; whereby an irregular stack of pallets being moved in a direction towards said rear wall is straightened by impingement against said rear wall and flared extensions of said side walls.

References Cited in the file of this patent

UNITED STATES PATENTS

| | | |
|---|---|---|
| 2,687,224 | Fontaine | Aug. 24, 1954 |
| 2,711,255 | Ashley | June 21, 1955 |